United States Patent
Hartkop et al.

(10) Patent No.: US 11,975,864 B2
(45) Date of Patent: May 7, 2024

(54) MULTI SENSOR SUPPORT STRUCTURE

(71) Applicant: Espheric, LLC, Denver, CO (US)

(72) Inventors: David Thomas Hartkop, Medford, OR (US); Jon Fetzer, Denver, CO (US)

(73) Assignee: Espheric, LLC, Denver, CO (US)

( * ) Notice: Subject to any disclaimer, the term of this patent is extended or adjusted under 35 U.S.C. 154(b) by 103 days.

(21) Appl. No.: 17/892,942

(22) Filed: Aug. 22, 2022

(65) Prior Publication Data

US 2022/0396369 A1 Dec. 15, 2022

Related U.S. Application Data

(63) Continuation-in-part of application No. 15/597,232, filed on May 17, 2017, now Pat. No. 11,420,766.

(60) Provisional application No. 62/337,335, filed on May 17, 2016.

(51) Int. Cl.
| | |
|---|---|
| *B64D 45/00* | (2006.01) |
| *B64C 39/02* | (2023.01) |
| *B64U 20/30* | (2023.01) |
| *B64U 20/87* | (2023.01) |
| *B64D 47/08* | (2006.01) |
| *B64U 10/14* | (2023.01) |
| *B64U 101/30* | (2023.01) |
| *G03B 15/00* | (2021.01) |

(52) U.S. Cl.
CPC .............. *B64D 45/00* (2013.01); *B64C 39/024* (2013.01); *B64U 20/30* (2023.01); *B64U 20/87* (2023.01); *B64D 47/08* (2013.01); *B64U 10/14* (2023.01); *B64U 2101/30* (2023.01); *G03B 15/006* (2013.01)

(58) Field of Classification Search
CPC ........ B64D 45/00; B64D 47/08; B64U 20/87; B64U 20/30; B64U 10/13; B64U 2101/30; B64U 60/60; B64U 27/006; B64C 39/024; G03B 15/006
See application file for complete search history.

(56) References Cited

U.S. PATENT DOCUMENTS

| | | | |
|---|---|---|---|
| 2,457,425 A | 12/1948 | Wolfard | |
| 6,976,899 B1 * | 12/2005 | Tamanas | B62D 57/04 446/454 |
| 7,273,195 B1 * | 9/2007 | Golliher | A63H 27/12 244/17.11 |

(Continued)

FOREIGN PATENT DOCUMENTS

| | | | | |
|---|---|---|---|---|
| CN | 110733654 A | * | 1/2020 | ............ B64C 27/08 |
| CN | 111824441 A | * | 10/2020 | ............ B64C 27/08 |
| CN | 112407308 A | * | 2/2021 | ............ B64D 45/00 |

OTHER PUBLICATIONS

Notice of Allowance for U.S. Appl. No. 15/597,232 dated Jan. 27, 2020.

(Continued)

*Primary Examiner* — Benjamin P Lee
(74) *Attorney, Agent, or Firm* — C. Tumey Law Group PLLC

(57) ABSTRACT

A shield system for an unmanned arial vehicle (AUV) is provided. The shield system includes inner shield members rigidly mounted to at least the rotor arms of the AUV and outer shield members shock mounted to the inner shield members. The shield system defines opening for sensors, payload or mechanical portions of the UAV.

18 Claims, 5 Drawing Sheets

(56) References Cited

U.S. PATENT DOCUMENTS

| | | | |
|---|---|---|---|
| 10,358,213 B2* | 7/2019 | Freeman | B64C 1/16 |
| 10,696,372 B2* | 6/2020 | Aldana López | B64U 10/70 |
| 10,766,610 B2* | 9/2020 | Kidakarn | B64U 10/14 |
| 10,875,645 B2* | 12/2020 | Prokhorov | B64C 1/40 |
| 10,988,241 B2* | 4/2021 | Santangelo | B64U 10/14 |
| 11,021,240 B2* | 6/2021 | Lee | B64U 50/13 |
| 11,661,188 B2* | 5/2023 | Briod | B64C 39/024 |
| | | | 244/17.23 |
| 11,708,160 B2* | 7/2023 | Briod | B60L 50/60 |
| | | | 244/17.23 |
| 2010/0224723 A1* | 9/2010 | Apkarian | B64U 30/24 |
| | | | 244/65 |
| 2011/0184647 A1 | 7/2011 | Yoel et al. | |
| 2014/0131507 A1* | 5/2014 | Kalantari | B64C 39/028 |
| | | | 244/2 |
| 2015/0204672 A1 | 7/2015 | Belanger et al. | |
| 2015/0274294 A1 | 10/2015 | Dahlstrom | |
| 2016/0001875 A1* | 1/2016 | Daler | B64C 17/00 |
| | | | 244/17.11 |
| 2016/0122015 A1* | 5/2016 | Hutson | B64C 39/024 |
| | | | 244/17.23 |
| 2016/0137293 A1* | 5/2016 | Santangelo | B64U 60/60 |
| | | | 244/50 |
| 2016/0157414 A1 | 6/2016 | Ackerman et al. | |
| 2016/0200415 A1* | 7/2016 | Cooper | B64C 39/001 |
| | | | 244/17.15 |
| 2016/0327950 A1 | 11/2016 | Bachrach et al. | |
| 2017/0113800 A1* | 4/2017 | Freeman | B64U 20/70 |
| 2017/0291697 A1* | 10/2017 | Kornatowski | B64C 39/024 |
| 2017/0313441 A1 | 11/2017 | Tsai | |
| 2017/0341776 A1 | 11/2017 | McClure et al. | |
| 2018/0002035 A1 | 1/2018 | Neely | |
| 2018/0155018 A1* | 6/2018 | Kovac | B64C 29/0016 |
| 2018/0257775 A1* | 9/2018 | Baek | B64C 27/20 |
| 2019/0100296 A1* | 4/2019 | Aldana López | B64C 1/063 |
| 2019/0138028 A1* | 5/2019 | Coleman | B64U 70/93 |
| 2020/0189712 A1* | 6/2020 | Briod | B64C 39/024 |
| 2021/0061463 A1* | 3/2021 | Briod | B64D 47/08 |
| 2021/0114730 A1* | 4/2021 | Macdonald | B64C 39/024 |
| 2021/0339845 A1* | 11/2021 | Milan | B64U 30/299 |
| 2022/0097865 A1* | 3/2022 | Sidoti | A63H 27/12 |
| 2022/0306284 A1* | 9/2022 | Howe | B64U 70/97 |
| 2023/0227184 A1* | 7/2023 | Heremans | B64U 30/299 |
| | | | 244/129.1 |
| 2024/0002074 A1* | 1/2024 | Nakravesh | B64C 27/006 |

OTHER PUBLICATIONS

Non-Final Office Action Summary for U.S. Appl. No. 15/597,232 dated Jun. 4, 2019.

* cited by examiner

Top

Perspective

Front

Side

MULTI SENSOR SUPPORT STRUCTURE

TECHNICAL FIELD OF THE INVENTION

The present invention relates to camera and/or sensor support structures that may be attached to multi-rotor aircraft that may be operated either remotely or autonomously. Further, the sensor support structure relates to arrays of multiple sensors that provide a complete or spherical point of view by virtue of the multiple sensors having overlapping fields of view. The present invention also relates to support schemes by which a sensor-supporting structure may be attached to the airframe of a multi-rotor aircraft in such a manner that it is vibrationally dampened by a multi-directional tension shock mount arrangement with no portion of the aircraft in view of the sensors and with either a neutral or a restorative effect on locating the support structure's center of mass at or near the center of mass or geometric structure of the aircraft.

SUMMARY OF INVENTION

The invention is a sensor support structure built as an open framework that can be assembled around the body of a multi rotor aircraft such that the sensors overlapping fields of view together collectively provide a completely spherical field of view with no portion of the aircraft within the spherical field of view. The framework consists of straight or curved struts which connect some number of hubs or unions. Each hub is provided with a means for the secure attachment of a camera or other sensor. The cameras are mounted such that they face outward, away from the center point of the framework. Some number of hubs are also provided with a means for the secure attachment of tensioned elastic members. These attachment points face inward toward the middle of the framework. The tensioned elastic members provide tension force between the framework and attachment members placed upon the structure of a multi rotor aircraft. These attachment members are built such that they allow for some adjustment in the X, Y and Z directions, facilitating the placement and adjustment of the invention's center of mass with respect to the aircraft. The multi rotor aircraft may be contained by the frame in such a way that its rotors emerge or are located wholly outside the body of the support structure, while the power supply, electronics, and much of the mechanical structure of the aircraft are contained within. In operation, the multi rotor aircraft is able to fly while the structure of the aircraft, including its rotors, are entirely outside of the field of view of any of the sensors. The given invention thus provides an unobstructed and vibrationally dampened spherical point of view. Such a point of view, when captured with video cameras, can be post-processed and displayed in one of several virtual reality (VR) formats and viewed on a conventional display or with a head-mounted display (HMD). The use of cameras or laser range finding sensors (LIDAR or Structured Light) may also be used for the capture and subsequent reconstruction of three-dimensional information about an environment.

DETAILED DESCRIPTION OF A PREFERRED EMBODIMENT OF THE INVENTION

Figure 1A:
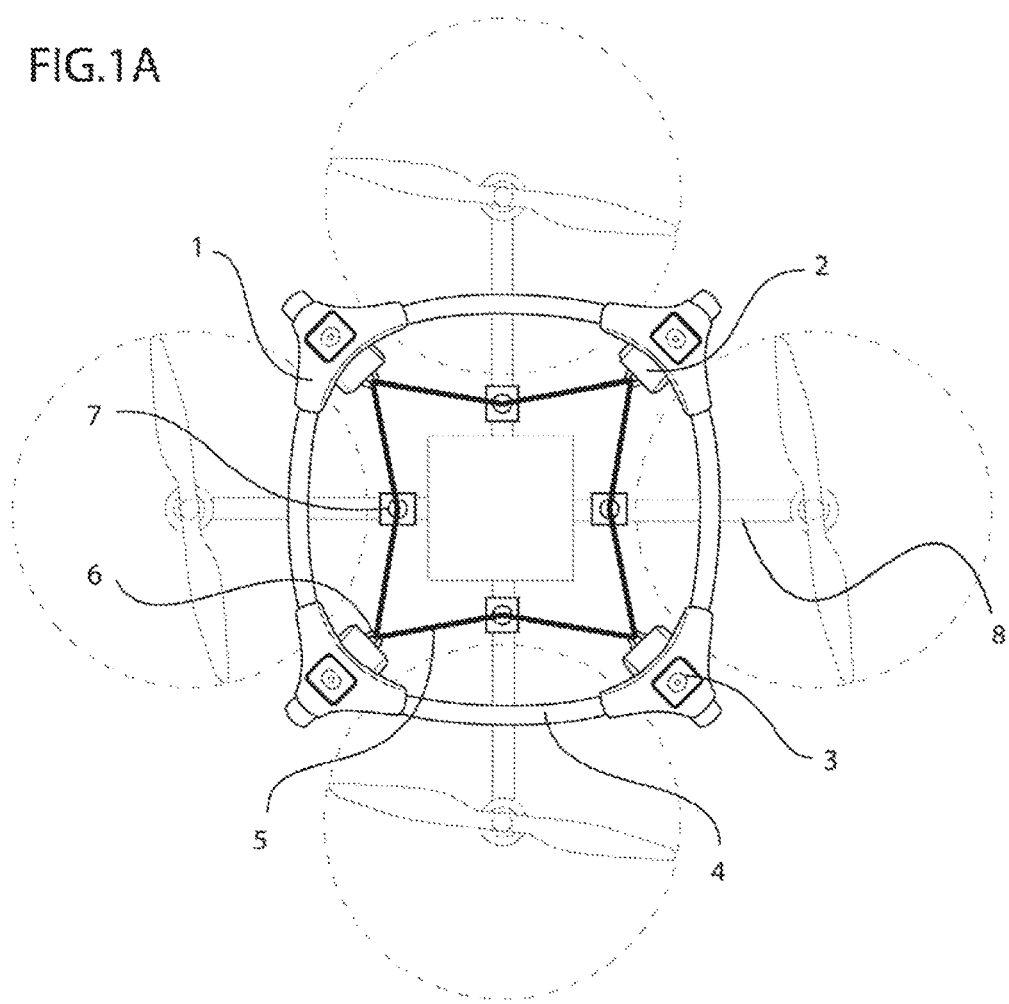
FIG. 1A is a top view of a preferred embodiment of the invention shown attached to a quadcopter multi rotor aircraft.
Figure 1B:
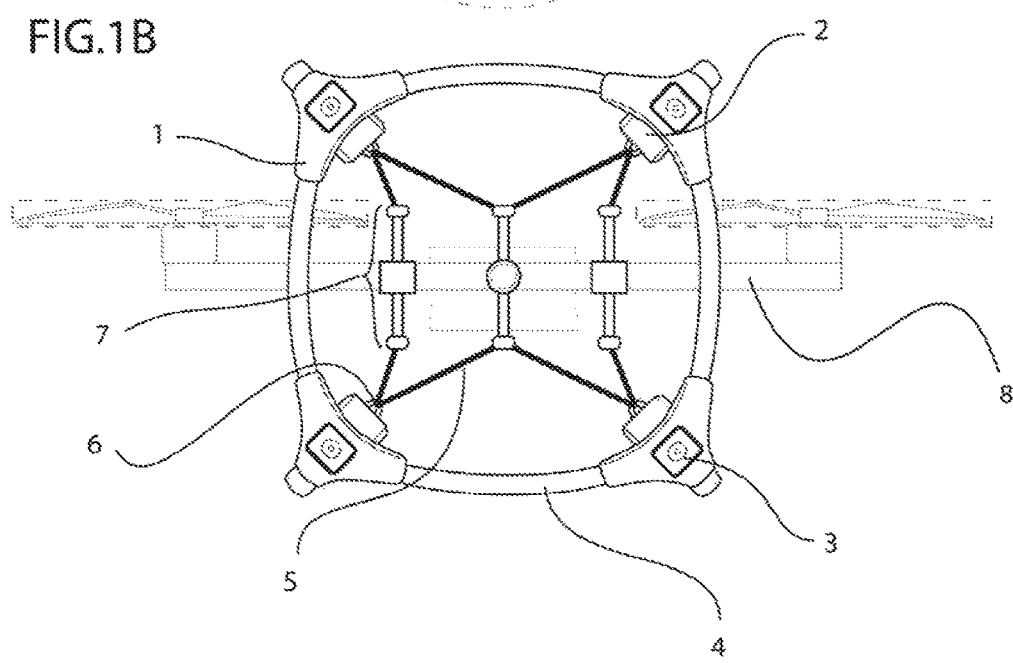
FIG. 1B is a side view of a preferred embodiment of the invention shown attached to a quadcopter multi rotor aircraft.
Figure 2:
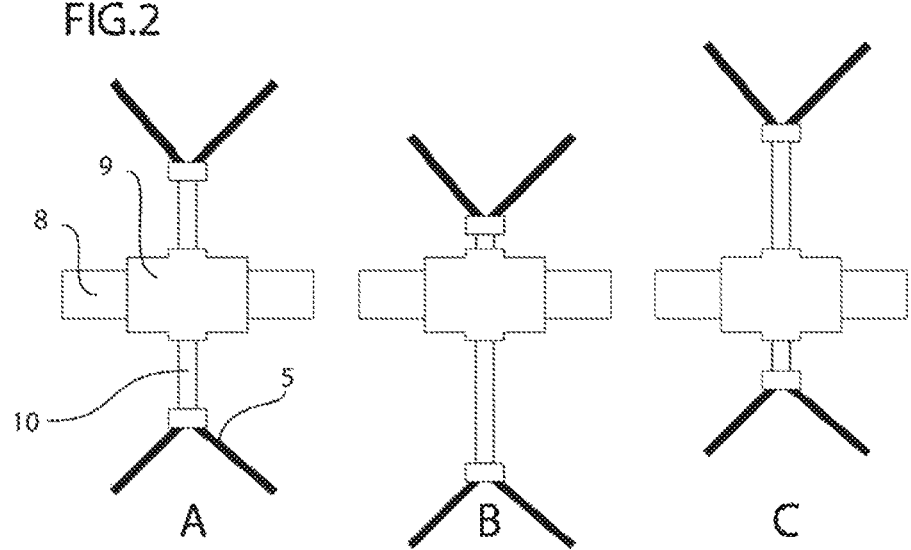
FIG. 2 shows three different exemplary configurations of connection bars which are attached to the aircraft's framework.

A preferred embodiment of the given invention consists of lightweight camera support structure created as an open framework around a quadcopter multi rotor aircraft. As shown in FIG. 1, the framework consists of a series of eight hubs 1 containing fixed camera mounts 2 for self contained high-definition wide-angle video camera recorders 3. Each of the eight hubs is connected to three others by curved tubular struts 4. Both the hubs and the struts may be composed of carbon fiber composite or some comparable lightweight high-strength structural material. The framework is coupled to the four 'arms' of the quadcopter 8 by means of tensioned metal or polymer springs 5. The springs are stretched in a shock mount arrangement between inner connection points 6 on the framework and a set of four connection bars 7 that have been retrofitted to the aircraft. The connection bars 7, shown in FIG. 2, are held perpendicular to the aircraft's arms and can be adjusted in the Z-axis to provide adjustability of the framework's center of mass with respect to the aircraft. The connection bars 7 are each held to the aircraft frame 8 by means of a collared clamp 9. The attachment bars 10 provide for attachment points of tensioned elastic members 5 at both ends, and are able to be pre-set to a position within the collared clamp 9, as illustrated by the positional differences shown between FIGS. 2A, B, and C. The position of each attachment bar 10 can be mechanically fixed by means of a set screw or bolt within the clamp body 9. A slight X, Y adjustability is also provided by locating the collared clamp 9 on the aircraft's arms at slightly different positions.

Figure 3:
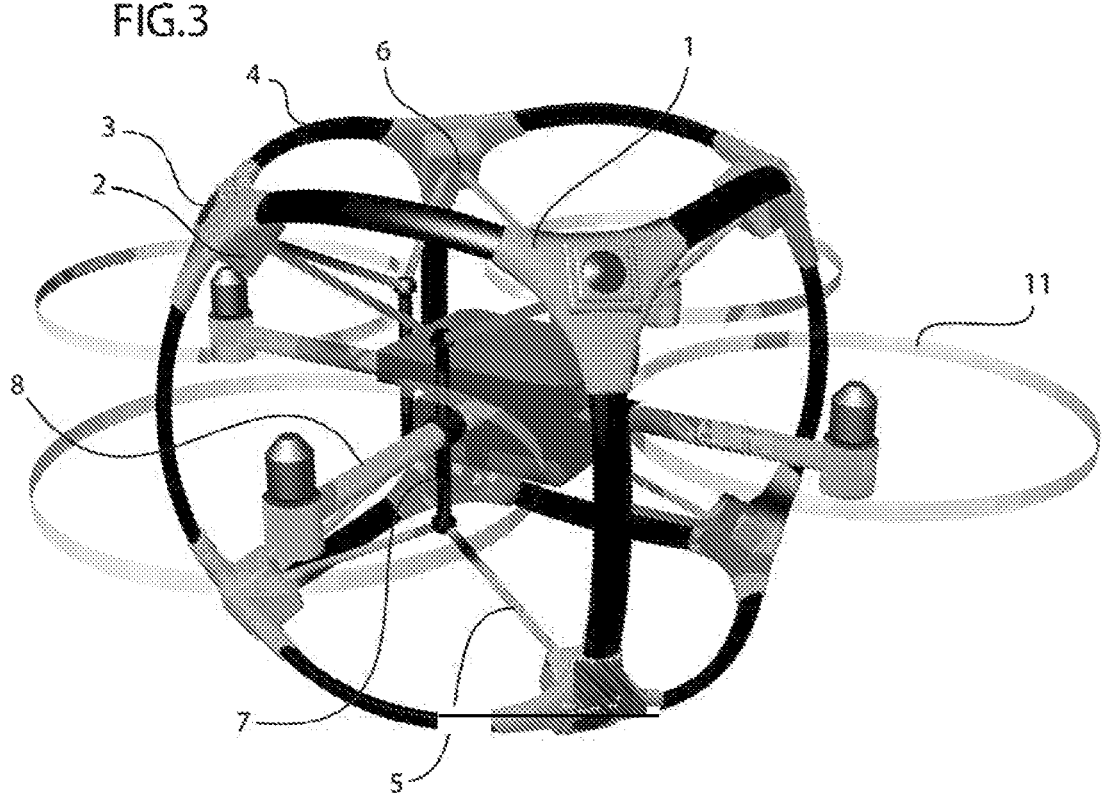
FIG. 3 shows a perspective rendering of a preferred embodiment of the invention attached to a quadcopter multi rotor aircraft.
Figure 4:
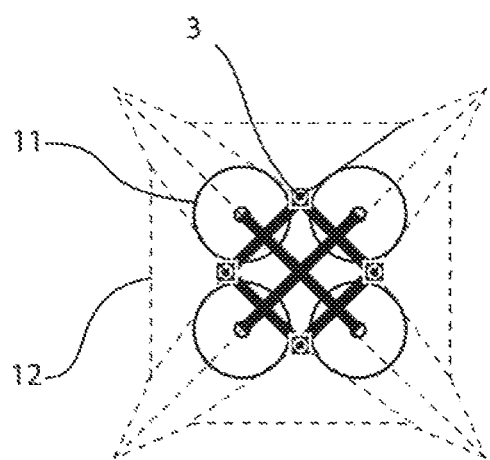
FIG. 4 shows four visual projections of a preferred embodiment the present invention in conjunction with a multi-rotor aircraft and a dotted line showing the boundary of the cameras combined field of view.
Figure 4:
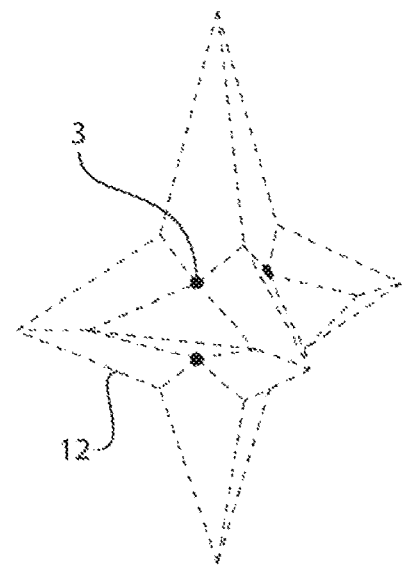
Figure 4:
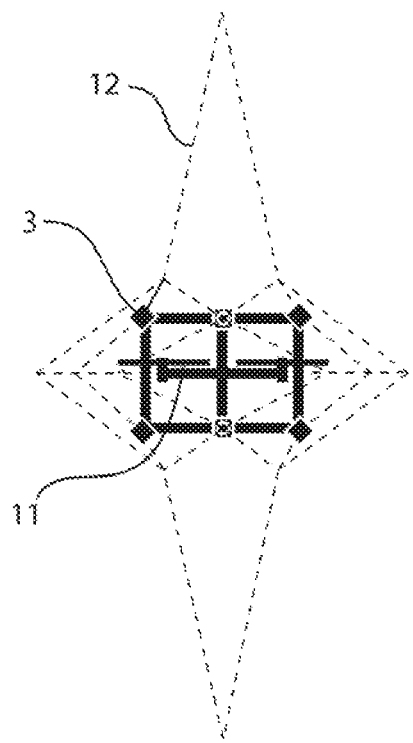
Figure 4:
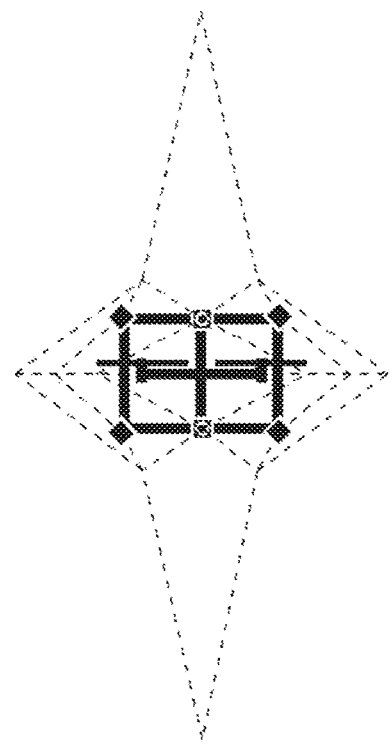

Optimally the frameworks' center of mass will be made to coincide with the center of mass of the aircraft in its unloaded state. FIG. 3 is a perspective rendered illustration of the present invention in conjunction with a quadcopter aircraft. The purpose of this illustration is to clarify the relationship of the camera holding framework with respect to the airframe of the aircraft. The tension members of the shock mount are shown as being the only structural connection between the camera framework and the aircraft. FIG. 4 shows four visual projections of the preferred embodiment in conjunction with a multi-rotor aircraft and a dotted line showing the boundary of the cameras combined field of view. In this projection, each of the eight cameras 3 are shown as pointing outward away from the center of the framework. Contained in the framework is a multi-rotor aircraft 11 which is entirely within the visually excluded region 12 that has as its boundaries the edges of the combined fields of view from the cameras 3. The boundaries of the cameras combine to form an 'invisible region' 12 in space of sufficient size as to allow for the presence of a lift-providing multi-rotor aircraft, which cannot be seen by any of the cameras attached to the framework. The invisible region 12 is sufficient in size and shape as to include within it the outermost edges of the aircraft rotors and, therefore, the collective filed of views of cameras 3 provide a complete unobscured spherical field of view. The present invention thus enables unobstructed spherical visual capture for the purposes of live VR capture, aircraft operational safety, VR content capture for entertainment and news gathering, 3D scanning of environments and structures, immersive remote exploration, archaeological studies, and disaster relief support.

Figure 5:
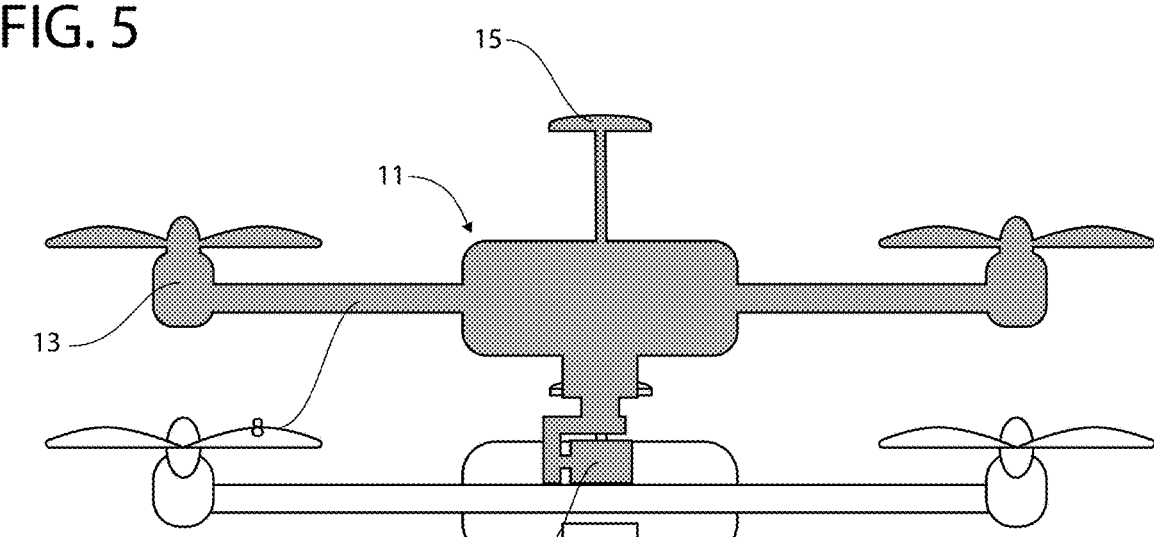
FIGS. 5-8 depict another embodiment of a shock absorbing framework in which the shock absorbing framework supports armor for the drone.

FIGS. 5-8 depict another embodiment of a shock absorbing framework in which the shock absorbing framework supports armor for the drone. FIG. 5 shows a general layout for a typical multi-rotor unmanned aerial vehicle (UAV) 11 having a central airframe body which control electronics, communications systems, attitudinal sensors, and power source. Shown next is a typical rotor 13 comprising a multiphase electrical motor and bladed propeller set away from the airframe by a tubular strut or 'arm' 8. Positioned on the bottom of the airframe is a multi-axis gimbal 14 supporting a camera or sensor package. Finally, set at the top of the aircraft is the antenna system 15 for receiving control signals from the ground or satellite, and for relaying video and positional data to the ground.

Figure 6:
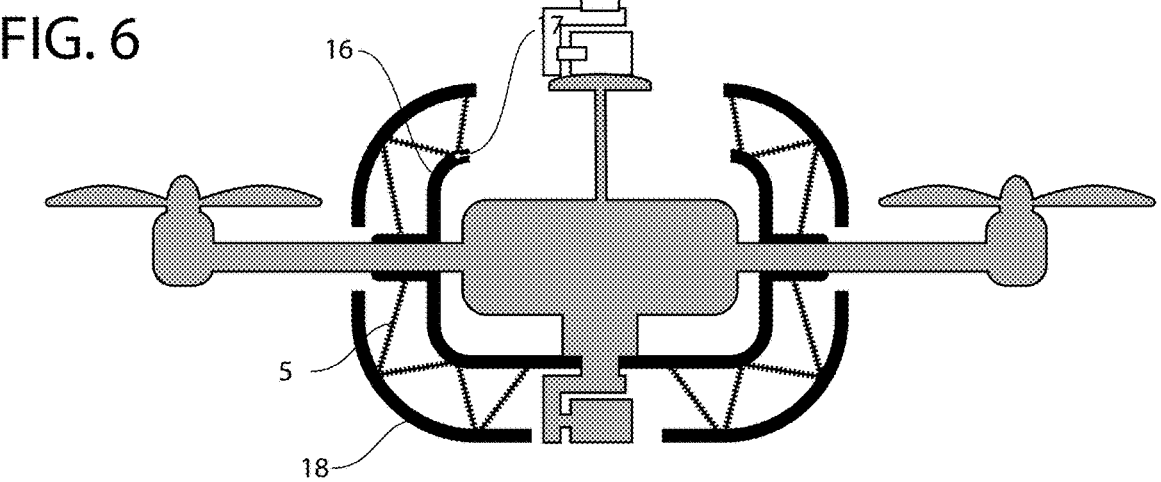

FIG. 6 shows a typical embodiment of the present invention installed on a typical UAV airframe. The invention consists of a solid inner shield 16 that is attached to the aircraft by means of rigid clamped connections about the aircraft arms 8. The inner frame may be constructed from stamped aluminum alloy, titanium, or alternatively from multi layered composite fabrics such as carbon fiber or polyarimid jacketing such as Kevlar or Nomex. The inner shield 16 is covered with a number of attachment points 17 for a webwork of tensioned springs 5 which may consist of synthetic fiber rope or monofilament, high tensile elastic rubbers or metallic coil springs. The outward facing ends of each elastic cord connects to an attachment point on the interior of an outer shield 18. Said outer shield is composed primarily of ultra-high molecular weight polyethylene, but may alternatively be constructed identically to the inner shield, using from stamped aluminum alloy, titanium, or alternatively from multi layered composite fabrics such as carbon fiber or polyarimid jacketing such as Kevlar or Nomex.

Figure 7:
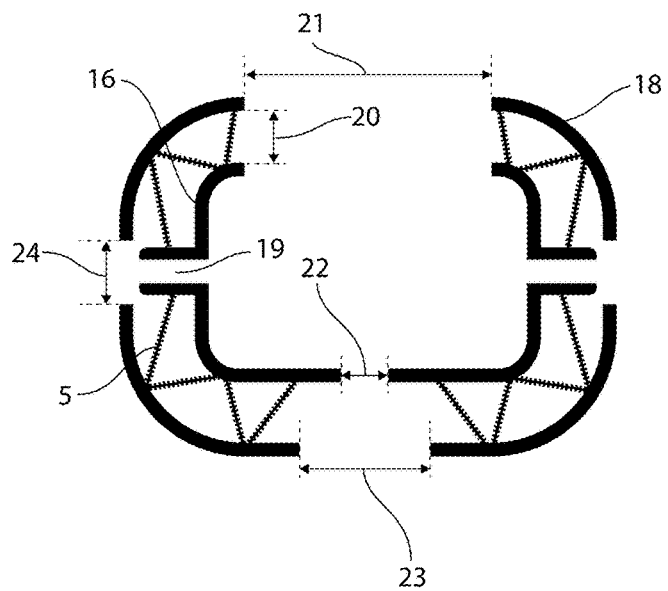

FIG. 7 depicts details of the invention as they relate to the protection and function of the UAV. The spatial separation between inner and outer shields 20 is established and maintained by means of pre-set tension of the tensioned springs 5. The separation is maintained preferably at a distance of greater than 10 cm. The shielding system allows the aircraft to use its gimbal-mounted camera or sensor package by means of first an opening in the inner shield 22 and a larger opening in the outer shield 23. The outer opening is large enough to allow for an unobstructed or partially unobstructed view and is spaced such that no part of the outer shield is mechanically in contact with the gimbal mounted equipment. The communications system of the drone is allowed an open view of the sky through a large opening through both the inner and outer shields 21. The larger opening allows for air circulation about the airframe of the UAV as may be required for cooling its batteries and electronics. Finally, it can be seen that there are openings through the outer shield 24 which allow for the passage of the aircraft rotor struts 8. These openings are set large enough that no part of the outer shield is in mechanical contact with 8.

Figure 8:
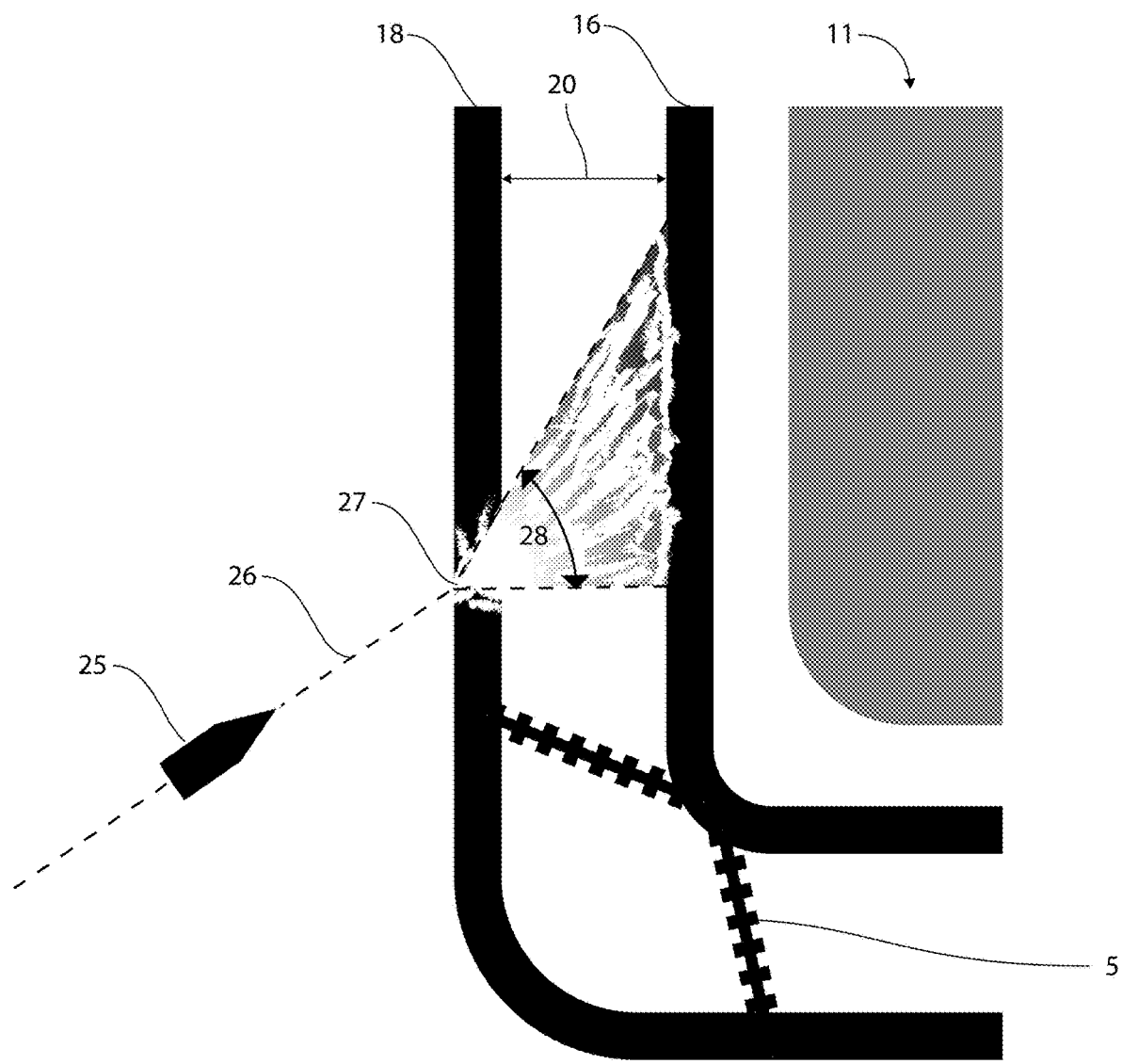

FIG. 8 depicts the present invention effectively shielding the UAV airframe 11 from a high velocity projectile 25. It should be noted that both inner outer shields 16 and 18 respectively are engineered to be ultra-thin in order to maximize flight capability of the UAV, but function as a system to stop projectiles. In practice, the outer shield 18 is effectively suspended into position about inner shield 16 by means of the elastic cords 5. This suspension provides and maintains preferably a spatial separation 20 of at least 10 cm distance. A high velocity projectile 25 traveling along path 26 will first encounter the outer shield at point of impact 27. At point of impact, a large proportion of the projectile's kinetic energy is converted into thermal energy which unbinds the material structure of said projectile and portion of outer shield 18 and results in a cone of liquified, gaseous and highly fragmented materials 28, which propagate through air gap 20 while spreading out. Upon reaching the inner shield, the cone of material has increased in area and decreased in its pressure per unit area. The inner shield, though thin, now has adequate integrity to stop these partially dispersed high velocity materials without being punctured. Some remaining fraction of the kinetic energy transferred into the outer shield 18 during the collision with 25 is absorbed by the spring force of the elastic cords 5 and thus greatly reduces the impact forces experienced by the double shielded UAV.

The invention claimed is:

1. An unmanned arial vehicle (UAV) shield system comprising:
    an inner shield comprising a plurality of inner shield members configured to be rigidly attached to a plurality of lateral arms of the UAV;
    an outer shield comprising a plurality of outer shield members configured to be positioned at a selected distance from the inner shield members to create a selected spacing between said outer shield members and said inner shield members; and
    a plurality of dampening mechanical couplings attachable to the inner shield members and said outer shield members to maintain the selected spacing therebetween and to absorb an impact applied to one or more of the outer shield members,
    wherein said dampening mechanical couplings comprise one or more mounts disposed on one or more of the inner shield members and disposed on one or more of the outer shield members and a plurality of selectively tensionable elastic members connectable to the one or more mounts.

2. The UAV shield system of claim 1 wherein one or more of the inner shield members and one or more of said outer shield members comprise one or more curved surfaces.

3. The UAV shield system of claim 2, wherein at least two of the inner shield members and at least two of the outer shield members are respectively configured to define an opening between their adjacent surfaces.

4. The UAV shield system of claim 1, wherein the UAV is a quadcopter having four arms and each of the inner shield members is configured to be rigidly coupled to one of the quadcopter's arms.

5. The UAV shield system of claim 3, wherein the opening is configured to allow a portion of the UAV or a sensor to extend through, occupy an area within the opening or to otherwise functionally utilize the opening.

6. The UAV shield system of claim 1, wherein one or more of the inner shield members comprise a material selected from the group comprising: aluminum alloy, titanium, multi layered composite fabrics, and a polyarimid jacketing.

7. The UAV shield system of claim 1, wherein one or more of the outer shield members comprise a material selected from the group comprising: ultra-high molecular weight polyethylene, aluminum alloy, titanium, a multi layered composite fabrics, and a polyarimid jacketing.

8. A method of shielding an unmanned aerial vehicle (UAV) comprising:
providing an inner shield comprising a plurality of inner shield members configured to be rigidly attached to a plurality of lateral arms of the UAV;
attaching the plurality of inner shield members to the plurality of lateral arms of the UAV;
providing an outer shield comprising a plurality of outer shield members configured to be positioned at a selected distance from the inner shield members to create a selected spacing between said outer shield members and said inner shield members;
providing a plurality of dampening mechanical couplings attachable to the inner shield members and said outer shield members to maintain the selected spacing therebetween and to absorb an impact applied to one or more of the outer shield members; and
attaching the dampening mechanical couplings to the inner shield members and the outer shield members
wherein said dampening mechanical couplings comprise one or more mounts disposed on one or more of the inner shield members and disposed on one or more of the outer shield members and a plurality of selectively tensionable elastic members connectable to the one or more mounts.

9. The system of claim 6, wherein multi layered composite fabrics comprises carbon fiber, and wherein the polyarimid jacketing comprises a material selected from the group consisting of Kevlar and Nomex.

10. The system of claim 7, wherein multi layered composite fabrics comprises carbon fiber, and wherein the polyarimid jacketing comprises a material selected from the group consisting of Kevlar and Nomex.

11. The method of claim 8 wherein one or more of the inner shield members and one or more of said outer shield members comprise one or more curved surfaces.

12. The method of claim 8, wherein at least two of the inner shield members and at least two of the outer shield members are respectively configured to define an opening between their adjacent surfaces.

13. The method of claim 8, wherein the UAV is a quadcopter having four arms and each of the inner shield members is configured to be rigidly coupled to one of the quadcopter's arms.

14. The method of claim 12, wherein the opening is configured to allow a portion of the UAV or a sensor to extend through, occupy an area within the opening or to otherwise functionally utilize the opening.

15. The method of claim 8, wherein one or more of the inner shield members comprise a material selected from the group comprising: aluminum alloy, titanium, multi layered composite fabrics, a polyarimid jacketing.

16. The method of claim 8, wherein one or more of the outer shield members comprise a material selected from the group comprising: ultra-high molecular weight polyethylene, aluminum alloy, titanium, a multi layered composite fabrics, polyarimid jacketing.

17. The method of claim 16, wherein multi layered composite fabrics comprises carbon fiber, and wherein the polyarimid jacketing comprises a material selected from the group consisting of Kevlar and Nomex.

18. The method of claim 15, wherein multi layered composite fabrics comprises carbon fiber, and wherein the polyarimid jacketing comprises a material selected from the group consisting of Kevlar and Nomex.

* * * * *